United States Patent [19]
Garrigues

[11] Patent Number: 5,894,955
[45] Date of Patent: Apr. 20, 1999

[54] FLOW REGULATED LIQUID DELIVERY SYSTEM

[76] Inventor: Jeffrey M. Garrigues, 838 Rio Virgin Dr., St. George, Utah 84770

[21] Appl. No.: 08/794,399

[22] Filed: Feb. 5, 1997

Related U.S. Application Data

[63] Continuation of application No. 08/482,017, Jun. 7, 1995, abandoned.

[51] Int. Cl.$^6$ ........................................... B67D 5/08
[52] U.S. Cl. ............................ 222/61; 222/608; 137/209
[58] Field of Search ........................... 222/61, 175, 396, 222/309, 400.7, 400.8, 401, 402.1, 402.18, 185, 529, 530, 608, 610, 628, 465.1; 280/201, 288.4; 239/24, 289, 373; 137/209, 212, 505.41

[56] References Cited

U.S. PATENT DOCUMENTS

| | | | |
|---|---|---|---|
| 2,774,521 | 12/1956 | Creighton | 222/465.1 |
| 2,982,297 | 5/1961 | Modes | 137/505.41 |
| 3,300,102 | 1/1967 | Budzich | 222/400.8 |
| 3,948,419 | 4/1976 | Polster | 222/61 |
| 3,949,902 | 4/1976 | Thompson | 222/129.1 |
| 4,493,441 | 1/1985 | Sedam et al. | 222/129.1 |
| 4,555,371 | 11/1985 | Jeans | 222/129.1 |
| 4,815,635 | 3/1989 | Porter | 222/136 |
| 4,869,402 | 9/1989 | Ash, Jr. | 222/401 |
| 4,911,339 | 3/1990 | Cushing | 222/610 |
| 4,960,228 | 10/1990 | Takahashi et al. | 222/129.1 |
| 5,062,591 | 11/1991 | Runkel | 224/148 |
| 5,119,978 | 6/1992 | Kalamaras et al. | 222/401 |
| 5,143,390 | 9/1992 | Goldsmith | 280/201 |
| 5,158,218 | 10/1992 | Wery | 222/610 |
| 5,201,442 | 4/1993 | Bakalian | 222/610 |
| 5,215,231 | 6/1993 | Paczonay | 222/610 |
| 5,221,016 | 6/1993 | Karpal | 222/183 |
| 5,265,769 | 11/1993 | Wilson | 222/175 |
| 5,301,860 | 4/1994 | Paczonay | 224/32 |
| 5,326,124 | 7/1994 | Allemans | 222/610 |
| 5,358,142 | 10/1994 | Holmes | 222/1 |

OTHER PUBLICATIONS

The "Oasis Bib Suit" for women makes using a CamelBak easy and comfortable Advertisement; Bicycling Magazine, Dec., 1994.
"Putting and End to Leg Cramps", Mountain Bike Action Magazine, Mar., 1995.
"It's About Time You Started Listening to Your Water Bottle", Mountain Bike Action Magazine, Mar., 1995.
"Torture–Testing 5 Water Packs", Mountain Bike Magazine, Feb., 1995, pp. 112–118.
"Camelbak Pakster vs. TWP Hunchback II", Bicycling Magazine, Jan., 1995.
"Fitness Q&A", Bicycling Magazine, Jan., 1993, p. 32.
"The Bomber Cage", Bicycling Magazine, Apr., 1993.
"Scientifically Tested", Mountain Bike for Adventure Magazine, Apr., 1993.

*Primary Examiner*—Philippe Derakshani
*Attorney, Agent, or Firm*—Merchant, Gould, Smith, Edell, Welter & Schmidt, P.A.

[57] ABSTRACT

A drinking system having a pneumatically charged container, a flow regulating manifold cap, a pull-valve, and nozzle. The flow regulating cap allows the pressurized container to deliver liquid with essentially constant flow as the air expands to fill the volume of the container. The nozzle may be mounted on the handlebars of a bicycle, and when the pull-valve is actuated, directs a liquid stream toward the cyclist's mouth. When on rough terrain, the nozzle may extend from its normal position and be placed between the cyclist's teeth or directed at the cyclist's mouth using a helmet mounted extension arm.

1 Claim, 10 Drawing Sheets

FLOW REGULATED LIQUID DELIVERY SYSTEM

This is a continuation of application Ser. No. 08/482,017, filed Jun. 7, 1995, now abandoned.

FIELD OF THE INVENTION

This invention relates to portable pressurized liquid delivery systems for personal use. This invention is primarily intended for use on bicycles and in other recreational or personal activities.

BACKGROUND OF THE INVENTION

The sport of bicycling, as well as other activities, often requires rigorous physical exertion for extended lengths of time, which causes the cyclist to lose large amounts of water in the form of sweat. To reduce cramping, improve performance, and to prevent dehydration, it is important for the cyclist to replace lost body fluids at regular intervals.

The most common type of drinking system found on bicycles today is the cage mounted water bottle, wherein the cage is mounted to the bicycle frame. This system requires the cyclist to reach down with one hand and exert significant force to remove the water bottle from its cage, thus compelling the cyclist to control the bicycle with only one hand and diverting the cyclists concentration. Drinking requires a backward titling of the head, impairing vision of the road, and taking the cyclist out of the most aerodynamic position.

Several inventions have been patented which attempt to overcome the inherent disadvantages of the cage mounted water bottle and which are referenced herein. One such design consists of a drinking system primarily composed of an inflatable bladder. While this system allows the cyclist to obtain a drink without extensive hand manipulation, the pressure produced with a fully expanded bladder would vary greatly from the pressure produced from a nearly empty bladder. Thus the cyclist would experience a great difference in flow rate between a full bladder and a nearly empty bladder. This system would also be prone to rupture since the bladder is, of necessity, soft and flexible. While a mouth actuated valve might be provided, a mounting means for this valve should be specified because a dangling tube is not only inconvenient but also unsafe due to the possibility of the tube getting caught in the spokes of the bicycle.

Another design consists of a non-pressurized water container which requires the cyclist to suck water from the container, which is mounted on the frame of the bicycle, to the cyclists mouth. While providing a check valve to prevent the cyclist from having to suck the water all the way up the lengthy tube every time a drink is taken, the vacuum required to draw water from the water container to the cyclists mouth would be a difficult task when the cyclist is out of breath. Again, mounting means for the liquid conduit tube is not provided.

Another design requires the cyclist to actuate a remote compression means mounted close to the handle bars, whereby a clamping device exerts pressure on the walls of a flexible water container. This device requires extensive modification to the bicycle, and therefore, would add a great deal of weight to the bicycle. The liquid delivery tube is fixed to the cyclist, which is inconvenient and cumbersome due to the necessity of connecting the apparatus to the cyclist every time the bicycle is mounted. Attaching the liquid delivery tube to the cyclist could also be unsafe should the cyclist fall off the bicycle.

Another invention utilizes the bicycle frame to store pressurized air. A pressure regulator supplies air at a constant pressure to a liquid container. The liquid container is separated into two chambers by an expandable bag. Since the pressure in the liquid container is maintained at a constant level, the liquid will be delivered to the cyclist at a constant rate, no matter how much water remains in the container. While the pressure regulator included in this invention provides a constant flow rate to the cyclist, as the liquid is discharged from the container, several disadvantages remain.

This system requires two pressure vessels, a supply reservoir and the liquid container, with the pressure regulator mounted between these vessels, requiring separate mounting means and adding unnecessary weight to the bicycle. Utilizing the bicycle frame as a pressure vessel requires extensive and permanent modification including welded fittings and sealed ends.

It is clear from the above discussion that many improvements can be made to the existing art, including the following characteristics. The cyclist should not be required to remove his/her hands from the handle bars to get a drink. The cyclist should be able to receive a drink on smooth or rough terrain without loss of control of the bicycle. An option for a large capacity container should be included. The device should be pressurized to provide a stream of liquid into the cyclists mouth without requiring the cyclist to apply suction. Air is the most convenient source of pressure since many cyclists carry miniature air pumps for the purpose of inflating their pneumatic tires in the event of a flat tire. Since air is compressible it can be stored in a small volume and expanded as the liquid is discharged from the container. The device should provide constant, steady flow to the cyclist, independent of the actuating pressure. The system should be as simple as possible, while maintaining the required functionality, to reduce weight and to increase ruggedness and reliability. The apparatus should be detachable to allow the cyclist the option of not using the device on short rides. Filling the unit with liquid and pressurizing with air should be convenient.

SUMMARY OF THE INVENTION

The present invention includes all of the advantages, stated above, which are necessary to provide an improved liquid delivery system. In one embodiment, a container adapted to withstand pressure is connected to a flow regulator. The flow regulator is connected to an intake conduit which extends to near the bottom of the container interior. The flow regulator is also connected to a transfer conduit which is connected to a shut-off valve. The shut-off valve is also connected to a discharge conduit. Upon container pressurization, a liquid may be forced through the flow regulator at a relatively constant rate by opening the shut-off valve.

In another embodiment, a portable liquid delivery system provides a relatively constant flow of liquid by pressurizing a liquid containing container. Actuating a shut-off valve allows the pressurized liquid to pass through an intake conduit to a flow regulator. The liquid then passes through a transfer conduit through the shut-off valve.

Various container sizes and mounting means are provided. A small container mounts into a standard water bottle cage. A large container slidably mounts along the down tube of the bicycle and attaches to the seat tube. This container is insulated sufficiently to keep liquids cool or warm for extended lengths of time. A hollow handle, integral with the large container, is provided for easy removal and to provide extra volume for air pressurization. The mounting means for the large container consists of a slide mechanism mounted to the down tube and thus is extremely light. The angle between the seat and down tubes assists to keep the container in place and maintains it at a low center of gravity on the bicycle. A medium sized container, elliptically shaped to reduce drag, is mounted with a custom cage. This cage is mounted to the bicycle by means of the same slide as the large liquid container.

DETAILED DESCRIPTION OF THE PREFERRED EMBODIMENTS

Figure 1:
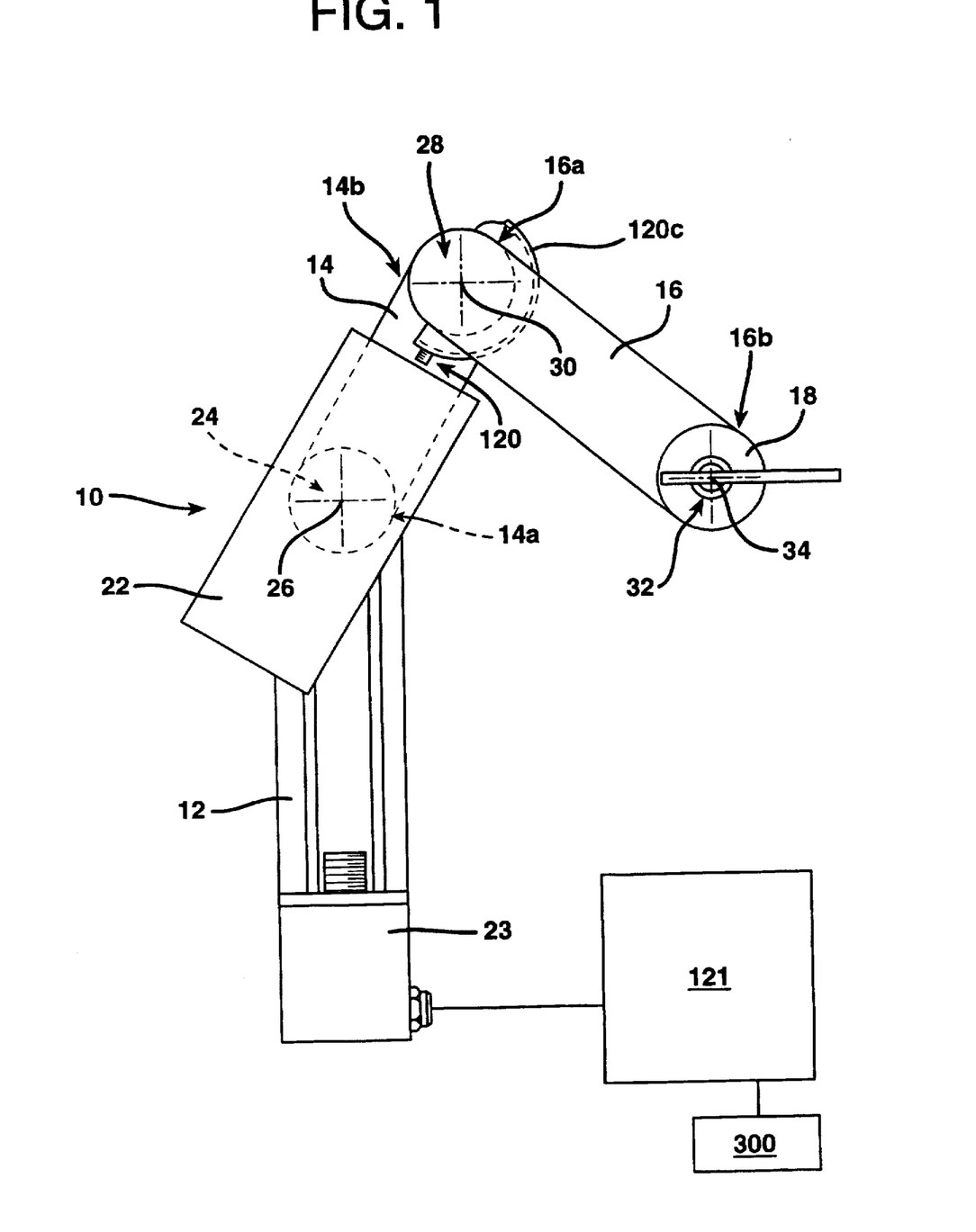
FIG. 1 is an elevational view of an embodiment of the present invention mounted on a bicycle.

One embodiment of pneumatically charged, flow regulated liquid delivery system according to the present invention is depicted in FIGS. 1 through 9. FIG. 1 is a view of a complete system mounted on a bicycle. FIGS. 2 through 9 are close-up views of various components of the liquid delivery system. The components are designated by like numerals in each of the figures in which they appear.

A large capacity thermoplastic liquid container 10 is shown in FIG. 1. The cutaway view of this container depicts support ribs 11 which increase the rigidity of the container. This increased rigidity reduces outward expansion of the container 10 upon pressurization. The interior wall (not shown) of the container may be formed of thermoplastic. The support ribs 11 are covered by a casing 13. The casing 13 may be also formed of thermoplastic. The support ribs form cells 14 between the interior container wall and the casing 13. The cells may be filled with polystyrene or similar insulating material to thermally insulate and structurally stiffen the container 10. The casing 13 of the large container has a T-shaped member 15 that slidably engages a C-shaped thermoplastic mounting base 17. The casing 13 of the large container is also equipped with a securing member 19 that engages the seat tube of the bicycle and secures the assembly firmly in place. An elastomeric bumper 21 may be attached to the container which contacts the seat tube and reduces the effects of shock/vibration thereby reducing noises, squeaks, etc. which may be annoying to the cyclist, and to account for small differences between the angle of the down and seat tubes from bicycle to bicycle. A handle 23 is provided for ease of installation and removal and is hollow to provide additional air volume.

Figure 3:
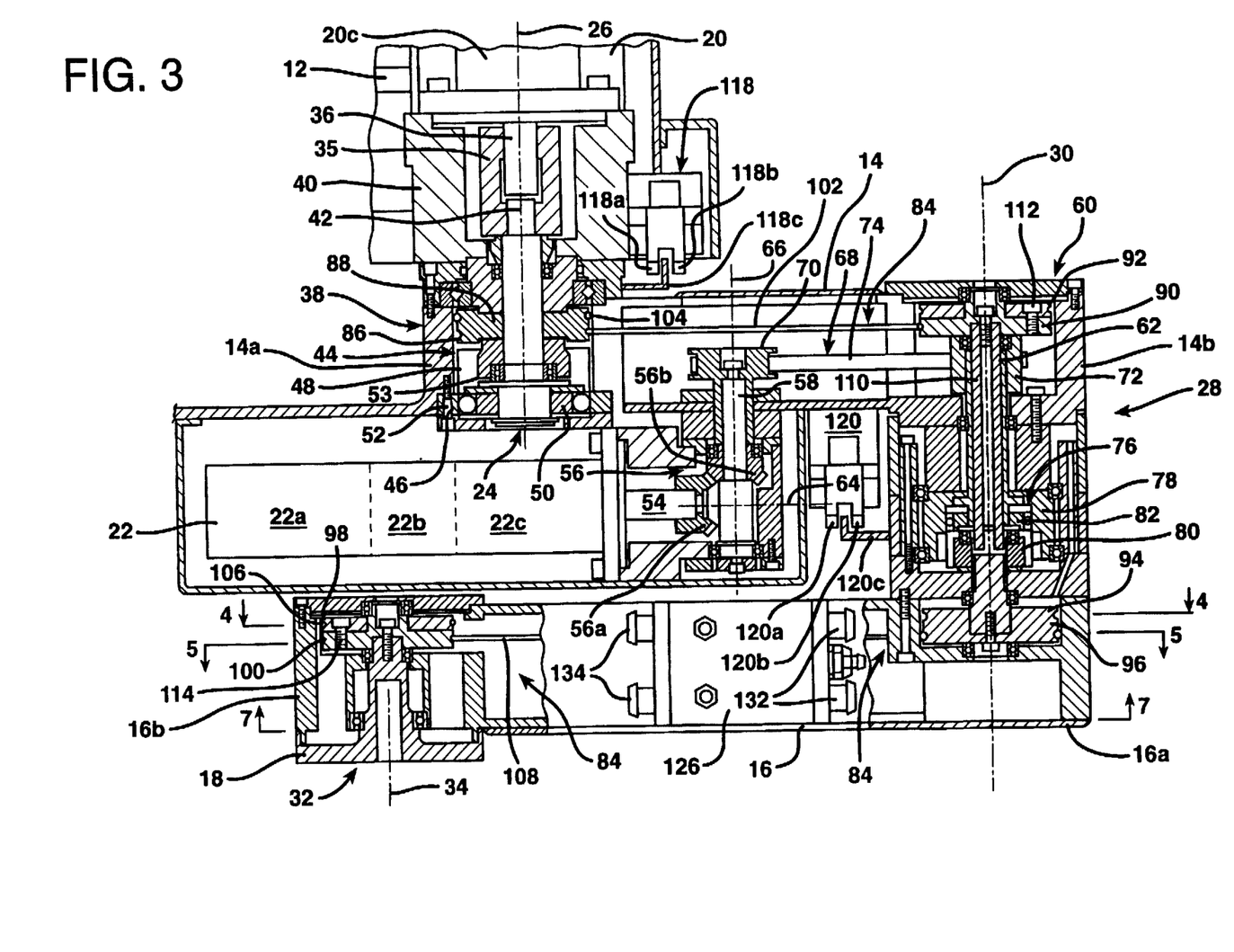
FIG. 3 is a cross-sectional view of one aspect of an embodiment of the present invention.

In use, the container 10 is filled with a liquid to a pre-determined level leaving some space for a compressible gas, such as air. The flow-regulating manifold cap 24, as shown in FIGS. 1 and 3, is then seated on the opening of the container 10. The manifold cap 24 may be formed of thermoplastic. As shown in FIG. 3, an elastomeric gasket 25 provides a seal between the container and the regulator body 27 of the manifold cap 24. A threaded ring 29 mates with external threads 30 on the container 10 and provides sealing engagement between the manifold cap 24 and the container 10. The threaded ring may be formed of thermoplastic.

Figure 2:
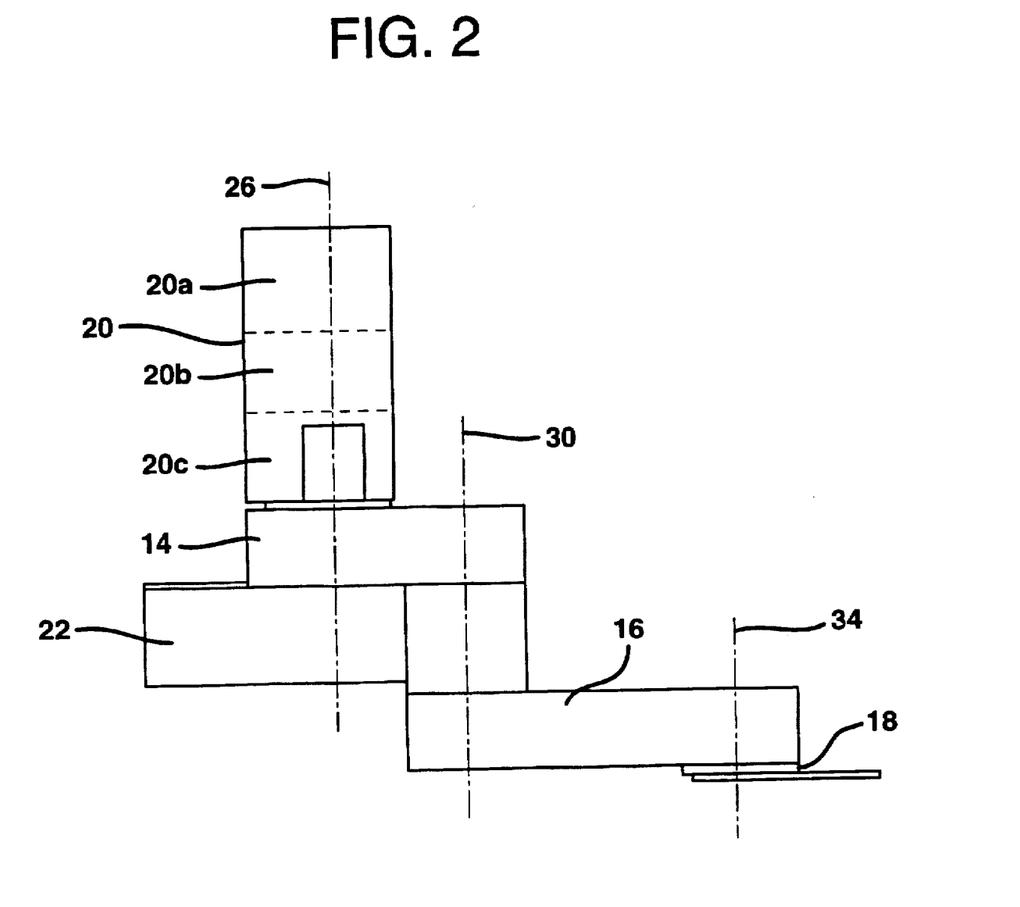
FIG. 2 is an elevational view of one aspect of an embodiment of the present invention.
Figure 5:
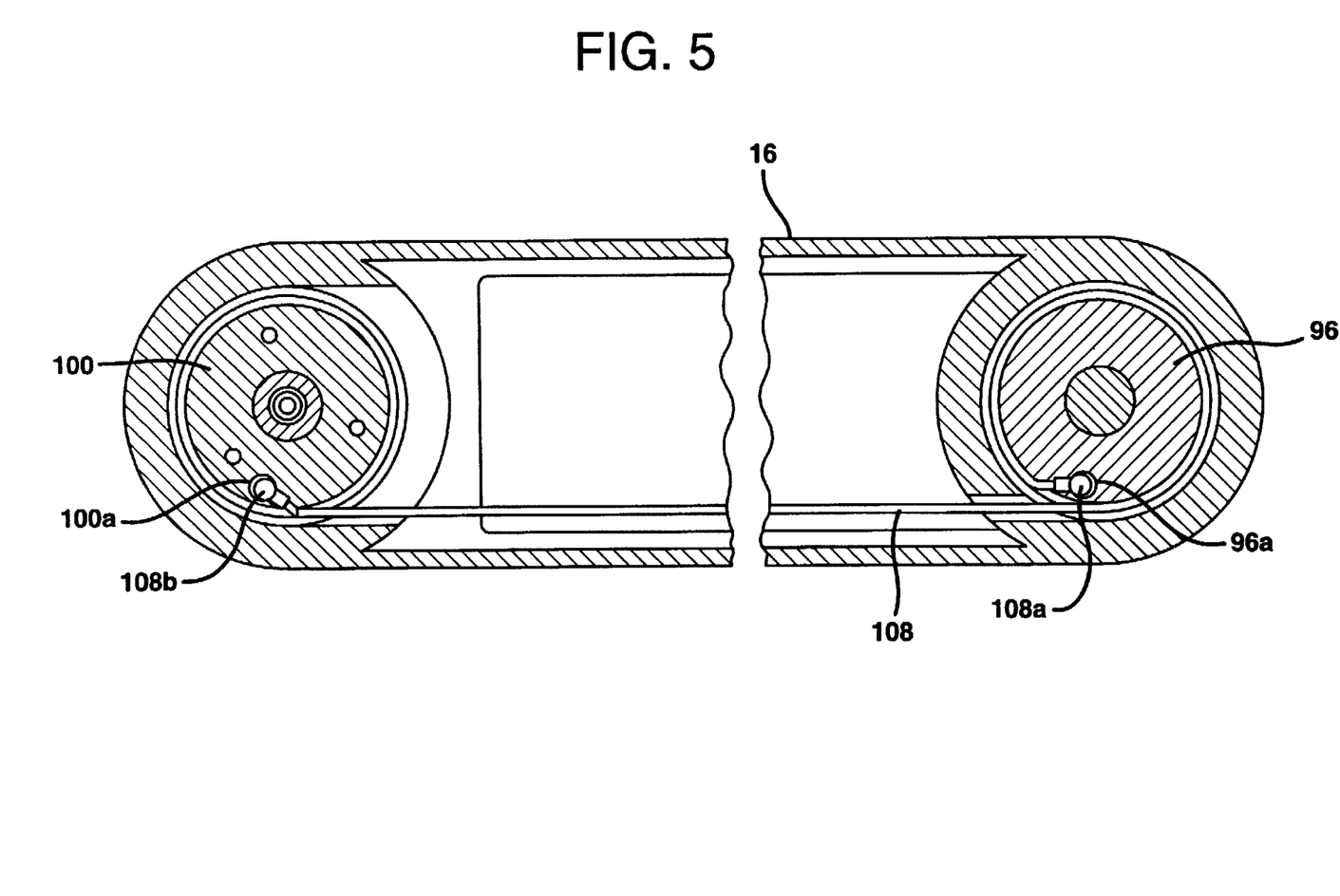
FIG. 5 is a cross-sectional view of one aspect of an embodiment of the present invention.

After the manifold cap 24 has been sealed to the container 10, pressurized air is injected into the container 10 using a standard bicycle air intake check valve (schrader valve) 31 which is mounted to the manifold cap 24. Sufficient air is forced into the container 10 through the air intake check valve 31 to raise pressure within the container 10 to a predetermined level. Upon actuation of the shut-off valve, herein called a pull-valve, which is depicted in FIGS. 2 and 5, the liquid is actuated by the pressurized air, causing it to flow from the bottom of the container 10 to the flow-regulating manifold cap 24 through an intake conduit 33. In one embodiment, an impervious flexible membrane 34 creates a barrier between the pressurized air and the liquid. The intake conduit 33 may be formed of thermoplastic. The liquid then passes through the restriction created between the poppet 35 and the regulator body seat 36 into the outlet chamber 37. The poppet 35 may be formed of stainless steel.

The elastomeric diaphragm 39 is supported by the piston 40 and is sealably fixed to the poppet 35 by means of a screw 41 and two washers 42. The diaphragm may be fabric reinforced. The pressure in the outlet chamber 37 acting against the diaphragm 39 is balanced by the force of the spring 43 acting in the opposite direction. The spring may be formed of stainless steel. If the pressure in the outlet chamber 37 increases, the diaphragm 39 will move upward, reducing the size of the aperture between the poppet 35 and the regulator body seat 36, thus reducing the outlet chamber 37 pressure until the chamber pressure acting on the diaphragm 39 equals the spring force. If the pressure in the outlet chamber 37 decreases the spring 43 will push the diaphragm 39 downward, increasing the area between the poppet 35 and the regulator body seat 36, thus increasing the chamber pressure until the force on the diaphragm 39 created by the chamber pressure balances the force created by the spring 43.

The nozzle 44 contains the minimum cross-sectional flow area and thus the smallest restriction within the fluid delivery system. The nozzle may be made of an elastomeric material. The pressure in the outlet chamber 37 is maintained at an essentially constant level during flowing conditions and the restriction in the nozzle 44 remains constant, therefore the flow will also remain essentially constant as the container pressure decreases during use.

The spring side of the diaphragm 39 is maintained at atmospheric pressure by vent holes 45. The diaphragm is secured between the regulator body 27 and the flange 46 by a suitable mechanical means such as a snap-fit. The regulator body 27 and flange 46 may be constructed of a thermoplastic. The half O-Ring 47 on the diaphragm 39 seats in a groove 48 in the regulator body 27 and provides a seal between the regulator body 27 and the diaphragm 39.

The spring force, and thus the flow rate is adjustable by means of an adjusting screw 49, which positions the spring button 51. The adjusting screw 49 may be made of stainless steel. The spring button 51 may be made of thermoplastic.

The adjusting screw is locked in place by a jam nut 53 which engages a flat washer 55. The adjusting screw 49 is threaded into an insert 57. The insert 57 may be made of brass. The adjusting screw 49 shown is a set screw but may consist of any other suitable configuration. A quick-lock fitting 59 or other suitable type of fitting is threaded into the outlet port 61 of the flow regulator. A flexible transfer conduit 63 transports the liquid from the outlet port 61 of the flow regulator to the inlet port 65 (shown in FIG. 5) of a pull-valve 66.

Figure 4:
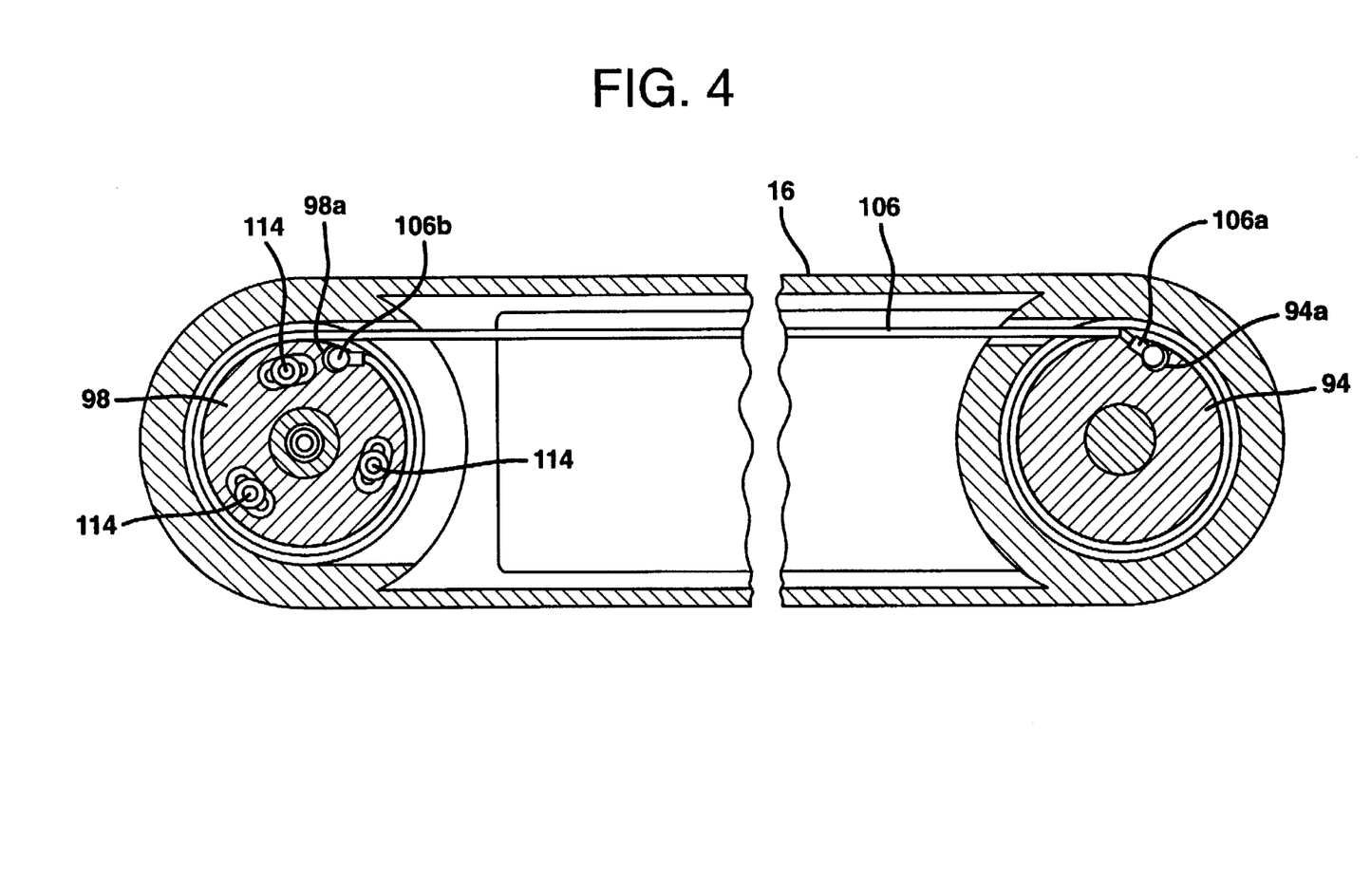
FIG. 4 is a cross-sectional view of one aspect of an embodiment of the present invention.

The pull-valve 66 and nozzle mounting apparatus are shown in FIGS. 2, 4 and 5. A quick-lock fitting 67, or other suitable fitting receives the transfer conduit 63, which extends from the outlet port 61 of the flow regulator. A second spring 69 holds the plug 71 normally closed against the pull-valve seat 73 which is integral with the valve body 75. The second spring 69 may be made of stainless steel and the valve body 75 may be made from thermoplastic. When the pull-ring 77 is actuated by the cyclists thumb, the plug 71 is unseated and pressurized liquid passes from the valve inlet chamber 79 around the plug and into the valve outlet chamber 81. From the valve outlet chamber 81 liquid flow passes through fitting 83 and into the valve outlet conduit 85.

The cyclist does not remove his/her hands from the handle bar when actuating the pull-valve 66, greatly enhancing safety. The pulling action of the thumb opposes the force of the remaining figures holding onto the handle bar. Thus, the pulling force available from the cyclists thumb is much greater than the pushing force available from the thumb or fingers.

An O-ring 87 prohibits fluid movement along the plug 71 to the exterior of the valve body 75. A bushing 89 is located inside the valve body 75 and guides the valve plug 71 into the valve seat 73. The pull-ring 77 is threaded into the valve plug 71 and tightened against its shoulder 90. As shown in FIG. 5, the valve body 75 slidably installs into the valve mounting base 91 and is locked into place with a mechanical detent 92. The nozzle mounting base 93 is hinged to the valve mounting base with a roll pin 95. Together the valve mounting base 91 and nozzle mounting base 93 form a clamp which opens to fit around the handle bar of the bicycle. This clamp is secured to the handle bar with a machine screw 97 which is threaded into a brass insert 99.

The nozzle 44 is connected to the outlet conduit 85 by means of a barbed hose coupling 101. The conduit passes through and is retained by a conduit aperture 102 in the nozzle mounting base 93. The conduit aperture 102 has a slot 103 one side of the slot 103 being visible in FIG. 4, through which the conduit may be detached from the mounting base 93 if desired by squeezing the conduit 85 through the slot. The nozzle 44 has a shoulder 105 which seats the nozzle 44 on the mounting base 93 and directs the stream of liquid generally toward the cyclist. The conduit 85 is looped below the nozzle mounting base 93 and has enough slack to allow the nozzle 44 to be pulled from its normal mounting position and held inside the cyclists mouth by means of the flange 107. This feature allows the cyclist to retain the nozzle in the mouth and easily obtain a drink when on rough terrain.

Figure 6:
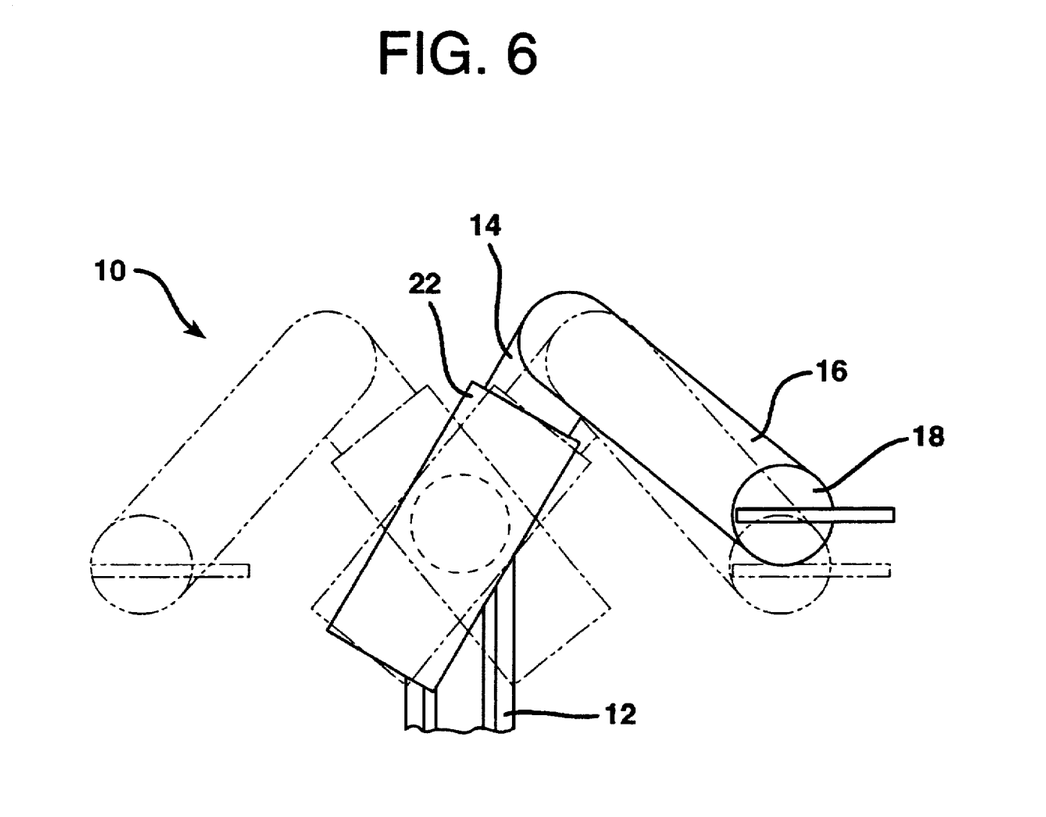
FIG. 6 is an elevational view of one aspect of an embodiment of the present invention.

In one embodiment of the present invention, an accessory for continuously directing the nozzle toward the cyclists mouth is provided as shown in FIG. 6. VELCRO® (a trademark for a J-type hook that can be attached by pushing and detached by pulling) tabs 109 are attached to the bicycle helmet 111. Mating VELCRO® material is mounted on the underside of base 113. An adjustable extension arm 115 extends from the base 13 to a position near the cyclists mouth. An support base 117 attaches to the extension arm and provides a snap in seat for the nozzle 41. This apparatus allows the nozzle to be continuously directed toward the cyclists mouth.

Figure 7:
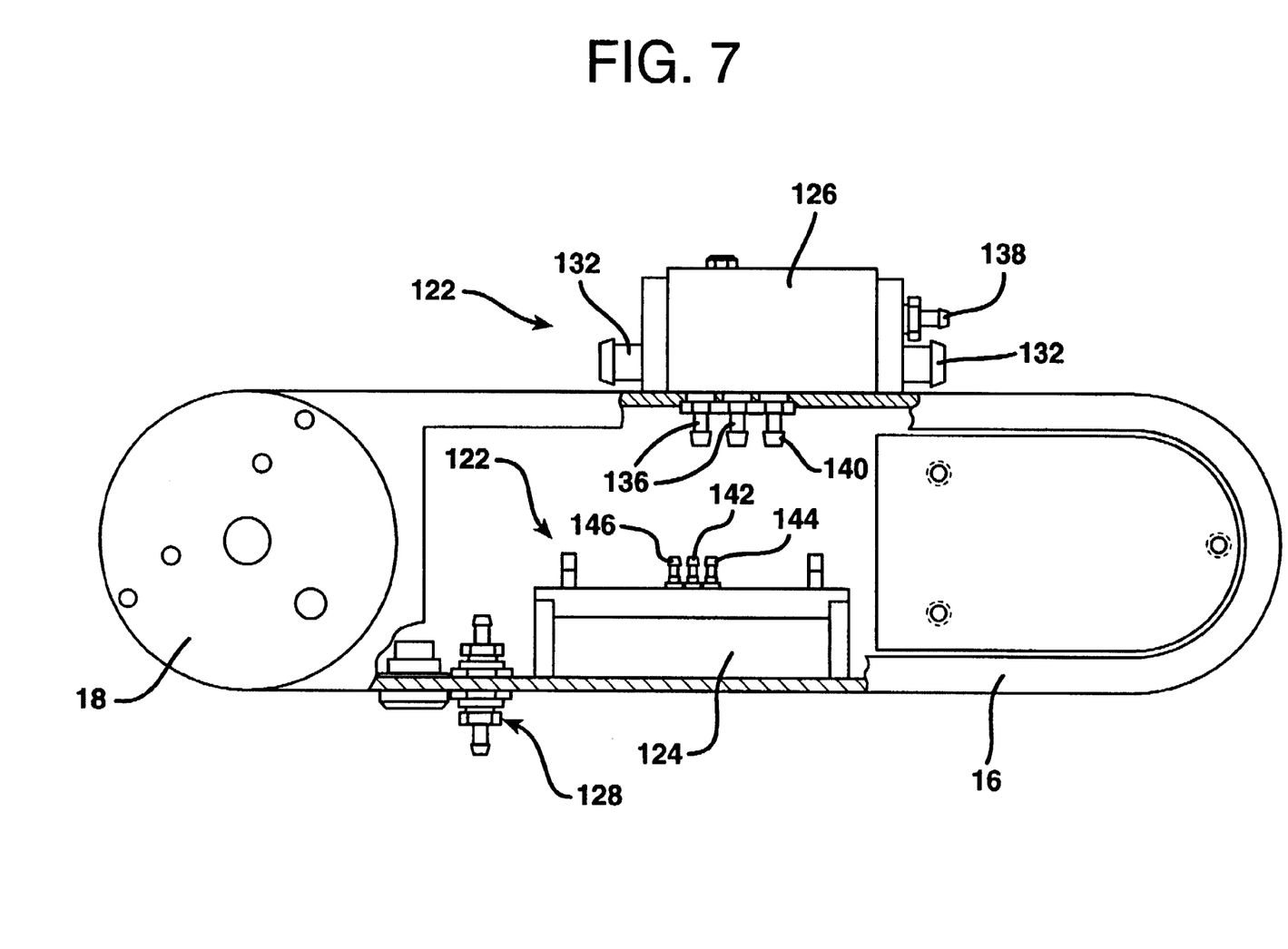
FIG. 7, is a cross-sectional view of one aspect of an embodiment of the present invention.

In an embodiment shown in FIG. 7, small container 119 is designed to retain pressure, mounts in a standard bicycle water container cage and is equal in size to a standard water container (approximately 28 ounces).

Figure 8:
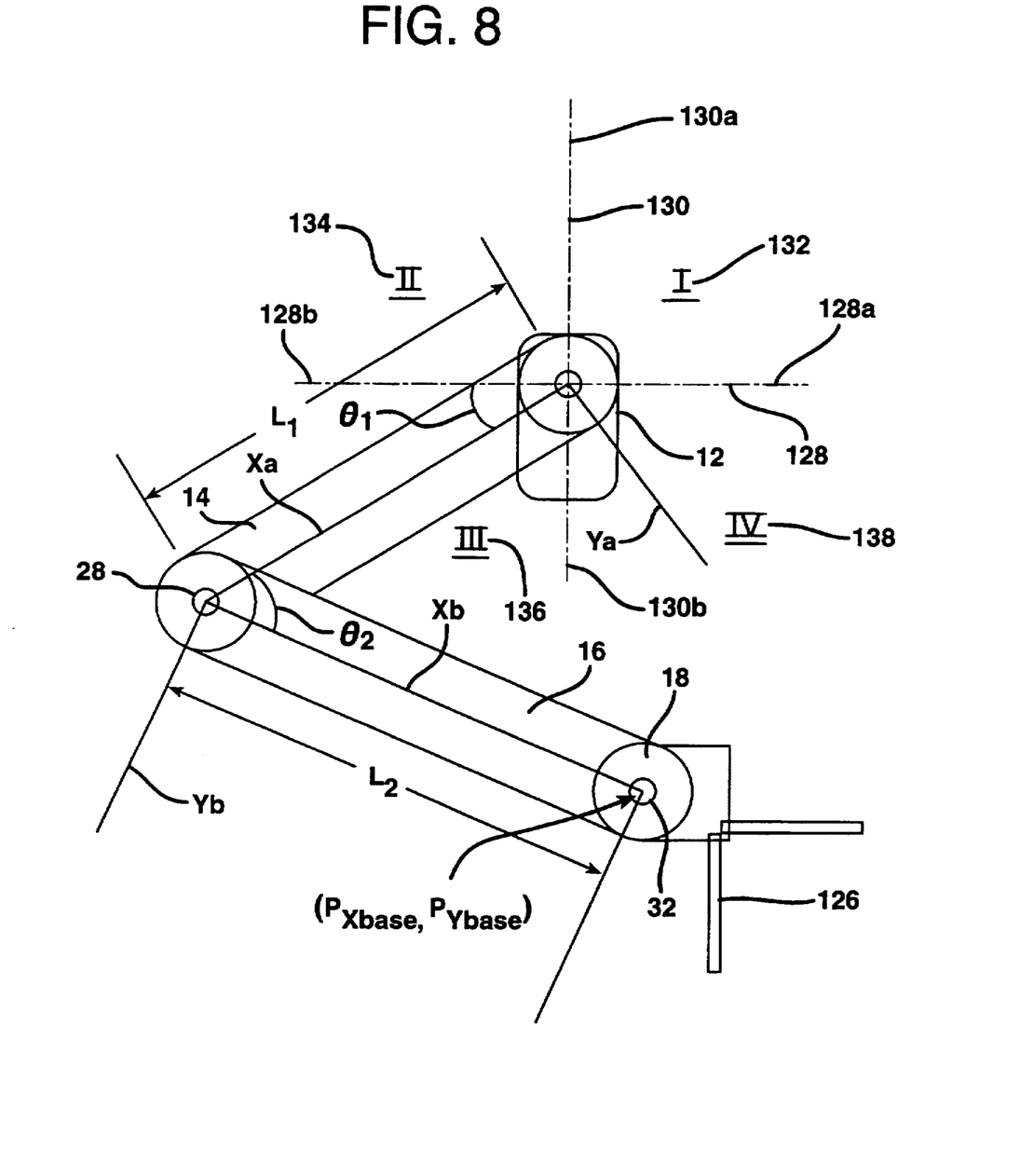
FIG. 8, is a cross-sectional view of one aspect of an embodiment of the present invention.
Figure 8A:
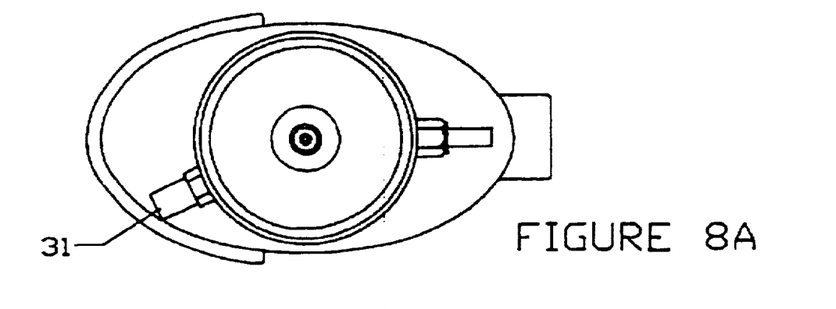
FIG. 8A is a top plan view of one aspect of the present invention.

In an embodiment shown in FIGS. 8 and 8a, container 121 is designed to retain pressure and mounts to a custom cage 123. The custom cage is detachably and slidably installed into a C-shaped mounting base 17 by means of a T-shaped slide 125 which is integral with the cage 123. The medium-sized liquid container 121 is elliptically-shaped and is designed to contain a volume of liquid equal to that of two standard bicycle water bottles (approximately 56 ounces).

Figure 9:
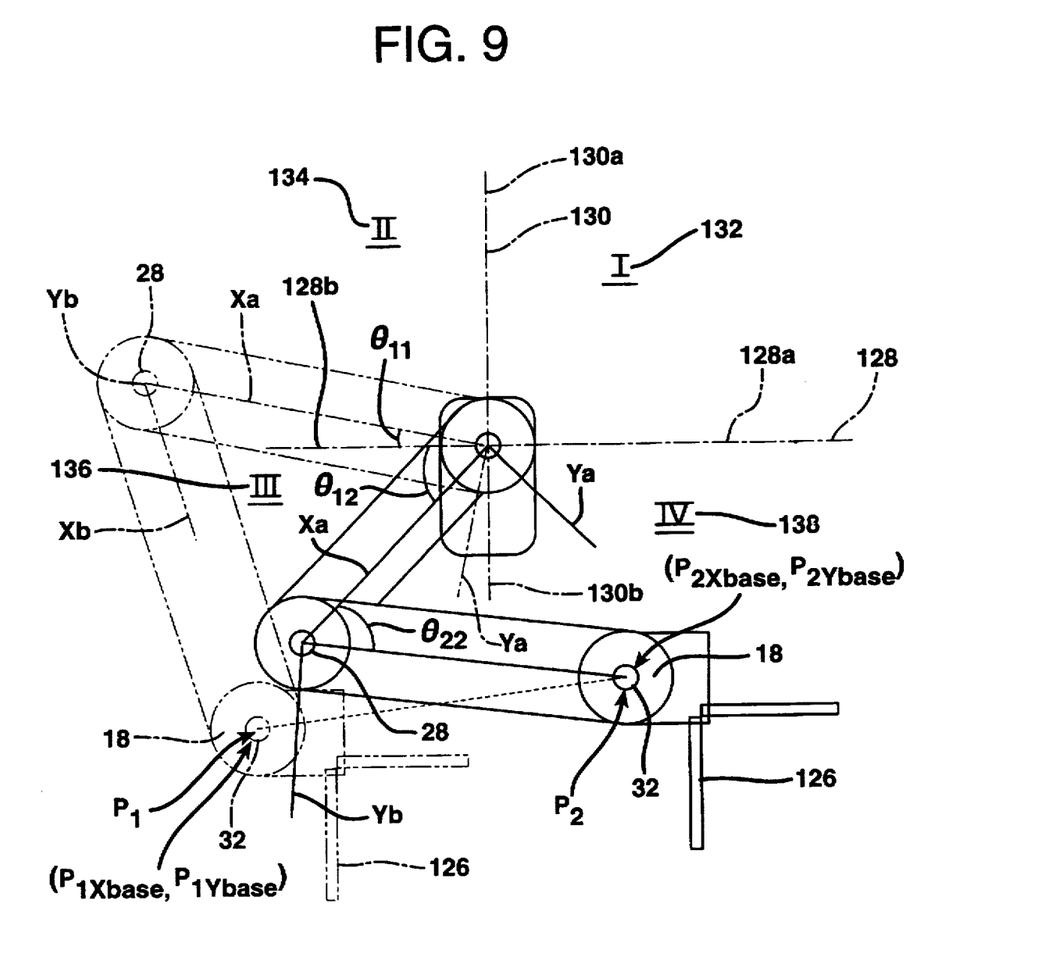
FIG. 9, is a cross-sectional view of one aspect of an embodiment of the present invention.

In an alternate embodiment a bite valve 129 as shown in FIG. 9 replaces the thumb operated pull-valve of FIGS. 1, 2 and 4. The bite valve is a shut-off valve like the pull-valve. The bite valve 129 has a rubber nozzle 131 which is connected to outlet conduit 85 by a barbed hose coupling 133. A ball 134 normally forced against the conically-shaped seat 135 of the nozzle 131. To actuate the valve the user bites the nozzle just behind the flange 137, which forces the ball 134 against the bias spring 137 which compresses and thereby allows the seat 135 to become eccentric in shape. Liquid is then allowed to move past the ball 134 and into the users mouth.

One embodiment of the disclosed invention includes a pneumatically charged liquid container, a flow regulating manifold cap, a handlebar mounted pull-valve, and handlebar mounted nozzle. The flow regulating cap allows the pressurized container to deliver the liquid to the cyclist with an essentially constant flow rate as the pressurized air expands in the container and decreases in pressure as the liquid is expelled. The flow regulating design does not require a separate supply pressure vessel as with a pressure regulated design. The nozzle, in its normal position, is mounted on the handle bars. When the pull-valve is actuated the nozzle directs a stream of liquid toward the cyclists mouth. When on rough terrain, the nozzle may be extended from is normal position and placed between the cyclists teeth or directed continuously at the cyclists mouth using a helmet mounted extension arm. The cyclist actuates the valve by inserting the thumb through a ring and pulling. The pulling action provides a large amount of force, while allowing the cyclists hands to remain on the handlebars and in control of the bicycle.

The container is filled to a pre-determined level with a liquid and a seal is established between the container and the manifold cap. Air is then injected into the container, through a standard bicycle stem valve (schrader valve), which is mounted in the manifold cap. The pressurized air fills the space in the container that is not taken up by the liquid. A miniature bicycle pump, such as is carried by many cyclists, may be used to accomplish the pressurization of the container.

A liquid conduit, sealably connected to the manifold cap, transports the pressurized liquid from the bottom of the container to the manifold cap upon actuation of the pull-valve. Located within the manifold cap is a spring/diaphragm pressure compensating flow regulator. As the liquid evacuates the container, the pressurized air in the container expands to fill the space once taken up by the evacuated liquid and the pressure in the container changes in inverse proportion to the volume change of the air. The flow regulator compensates for this pressure reduction by reducing the flow restriction through the regulator at lower container pressures. The flow regulator is only active when liquid is flowing and does not require a separate supply pressure container. A screw located on the top of the manifold cap allows the cyclist to adjust the flow rate to a desired level.

The pull-valve is slidably and detachably mounted, by means of a dovetail (or similar) slide, to a handlebar clamping bracket. The thumb ring on the valve enables the cyclist to insert the thumb into the ring and actuate the valve without removing his/her hand from the handle bars, thus maintaining control of the bicycle. The pulling motion of the thumb opposes the holding force of the fingers on the handlebar grip and therefore does not loosen the cyclist's grip on the handlebar, even on rough terrain.

The nozzle rests in the circular mounting boss that extends from the handlebar clamping bracket. From this position the cyclist may receive a stream of liquid at a pre-determined trajectory, similar to a drinking fountain. A length of tube, forming a loop under the handlebars, allows the cyclists to extend the nozzle into his/her mouth, pulling the tubing through the hole in the mounting boss, and holding the nozzle between his/her teeth. This is especially convenient on rough terrain. A slot in the circular mounting boss allows the tubing and nozzle to be removed with a minimum of force but does not allow accidental removal of the tubing from the circular boss under normal conditions. The tubing may also be attached to a helmet mounted extension arm and continuously directed toward the cyclists mouth.

Alternately, a bite valve, as shown in FIG. 8 may be used with the present invention, in place of the handlebar mounted pull-valve.

Upon activation of the bite valve or the pull-valve, liquid is discharged at a relatively constant rate.

The disclosed embodiments are given as examples. Numerous alternatives and variations exist that are within the intended scope of the claimed invention. For example, the flow regulator could be combined with the shut-off valve.

What is claimed is:

1. A liquid delivery system for individual use comprising:

a portable pressurizable container adapted to contain a potable liquid;

a potable liquid transfer conduit sealingly connected to said pressurized container;

a shut-off valve sealingly connected to said potable liquid transfer conduit;

a flow regulating valve sealingly connected to said potable liquid transfer conduit, said flow regulating valve automatically maintaining a predetermined and relatively constant positive rate of potable liquid flow from said pressurized container; and said shut-off valve being a bite valve.

* * * * *